US012683160B2

(12) United States Patent
Shao et al.

(10) Patent No.: US 12,683,160 B2
(45) Date of Patent: Jul. 14, 2026

(54) OLIVINE COMPOSITE CATHODE MATERIAL, PREPARATION METHOD AND APPLICATION THEREOF, AND LITHIUM-ION BATTERY

(71) Applicant: BEIJING EASPRING MATERIAL TECHNOLOGY CO., LTD., Beijing (CN)

(72) Inventors: Zongpu Shao, Beijing (CN); Yafei Liu, Beijing (CN); Yanbin Chen, Beijing (CN)

(73) Assignee: BEIJING EASPRING MATERIAL TECHNOLOGY CO., LTD., Beijing (CN)

( * ) Notice: Subject to any disclaimer, the term of this patent is extended or adjusted under 35 U.S.C. 154(b) by 111 days.

(21) Appl. No.: 18/815,861

(22) Filed: Aug. 27, 2024

(65) Prior Publication Data

US 2024/0421302 A1 Dec. 19, 2024

Related U.S. Application Data

(63) Continuation of application No. PCT/CN2022/103057, filed on Jun. 30, 2022.

(51) Int. Cl.
*H01M 4/58* (2010.01)
*C01G 49/00* (2006.01)
(Continued)

(52) U.S. Cl.
CPC ........ *H01M 4/5825* (2013.01); *C01G 49/009* (2013.01); *H01M 4/0404* (2013.01);
(Continued)

(58) Field of Classification Search
CPC .................................................. H01M 4/5825
See application file for complete search history.

(56) References Cited

U.S. PATENT DOCUMENTS

2021/0344012 A1 11/2021 Jen et al.

FOREIGN PATENT DOCUMENTS

CN    101070148 A    11/2007
CN    101969115 B    9/2013
(Continued)

OTHER PUBLICATIONS

International Search Report dated Mar. 28, 2023 in International Application No. PCT/CN2022/103057. English translation attached.
(Continued)

*Primary Examiner* — Stephan J Essex

(57) ABSTRACT

Provided are an olivine composite cathode material, a preparation method, and a lithium-ion battery. The composite cathode material includes a matrix and a composite phase. The matrix has a composition represented by formula I: $Li_xM^1_yMn_zFe_{1-z-u}M^2_u(PO_4)_w(RO_a)_b$ Cv, where $0.5 \leq x < 1.3$, $0 \leq y \leq 0.5$, $0 < z \leq 1$, $0 \leq u \leq 0.01$, $0 < w \leq 1$, $0 < v \leq 0.05$, $0 \leq \leq 8$, and $0 \leq b \leq 1$; $M^1$ is selected from at least one of Mg, Na, and K; $M^2$ is selected from at least one of Ga, Sn, V, Y, Mo, Al, Mg, Ce, Ti, Zr, Nb, Si, W, and In; and R is selected from at least one of Si, Cl, Br, S, Sb, and Sn. The composite phase has a composition represented by formula II: $T_mG_n$, where: $0.1 \leq m \leq 5$, and $0.1 \leq n \leq 5$; T is selected from at least one of Ti, Mo, Co, W, Zn, Cu, B, V, Nb, Ta, Pd, Cr, Ag, Al, Mn, Sn, Mg, Sc, Zr, and Hf; and G is selected from N and/or C.

18 Claims, 3 Drawing Sheets electron image 1

(51) Int. Cl.

| | |
|---|---|
| *H01M 4/02* | (2006.01) |
| *H01M 4/04* | (2006.01) |
| *H01M 4/36* | (2006.01) |
| *H01M 4/583* | (2010.01) |
| *H01M 10/0525* | (2010.01) |

(52) U.S. Cl.

CPC ........... *H01M 4/362* (2013.01); *H01M 4/583* (2013.01); *H01M 10/0525* (2013.01); *C01P 2004/61* (2013.01); *C01P 2006/40* (2013.01); *H01M 2004/028* (2013.01)

(56) References Cited

FOREIGN PATENT DOCUMENTS

| | | | | | |
|---|---|---|---|---|---|
| CN | 105047921 | A | | 11/2015 | |
| CN | 106450304 | A | * | 2/2017 | ........... H01M 4/505 |
| CN | 108091851 | A | | 5/2018 | |
| CN | 106058220 | B | | 7/2019 | |
| CN | 111710846 | A | | 9/2020 | |
| CN | 112701281 | A | * | 4/2021 | ........... C01B 25/45 |
| CN | 113363483 | A | | 9/2021 | |
| CN | 113942990 | A | | 1/2022 | |
| EP | 2538473 | A1 | | 12/2012 | |
| EP | 4245721 | A1 | | 9/2023 | |
| JP | 2012229147 | A | | 11/2012 | |
| JP | 2013069566 | A | | 4/2013 | |

OTHER PUBLICATIONS

First Office Action dated Nov. 4, 2025 received in corresponding patent family application No. KR1020247028685. English translation attached.

Extended European Search Report dated Jun. 20, 2025 received in corresponding European Application No. EP22913268.3.

First Office Action dated Jul. 2, 2025 received in corresponding European Application No. EP22913268.3.

Decision to Grant dated Jul. 17, 2025 received in corresponding patent family application No. JP2024552093. English translation attached.

Written Opinion dated Mar. 28, 2023 in International Application No. PCT/CN2022/103057. English translation attached.

First Office Action dated Jan. 23, 2025 received in corresponding patent family application No. CN202210772427.8. English translation attached.

Second Office Action dated Jun. 7, 2025 received in corresponding patent family application No. CN202210772427.8. English translation attached.

Notice of Reasons for Refusal dated Jan. 21, 2025 received in corresponding patent family application No. JP2024552093. English translation attached.

* cited by examiner

OLIVINE COMPOSITE CATHODE MATERIAL, PREPARATION METHOD AND APPLICATION THEREOF, AND LITHIUM-ION BATTERY

CROSS-REFERENCE TO RELATED APPLICATIONS

This application is a continuation of International Application No. PCT/CN2022/103057, filed on Jun. 30, 2022, the disclosure of which is hereby incorporated by reference in its entirety.

FIELD

The present disclosure relates to the technical field of new energy and lithium-ion batteries, and more particularly, to an olivine composite cathode material, a preparation method and use thereof, and a lithium-ion battery.

BACKGROUND

The rapid development of power batteries of new energy vehicles and market of energy storage batteries has prompted people to place higher requirements on fast charging performance and safety performance of lithium-ion batteries. A cathode material of the lithium-ion batteries is one of the key materials costing the highest and taking a great mass percentage in the lithium-ion batteries. The performance of the cathode material greatly determines an energy density, a fast charging performance, and a safety performance of the lithium-ion batteries. Lithium iron phosphate, as a representative of olivine cathode materials, has become one of the mainstream cathode material systems in the current market of the power and energy storage batteries due to its high energy density, excellent cycle performance and safety performance, and low cost and selling price.

However, the cathode material of lithium iron phosphate ($LiFePO_4$), due to its particularity of chemical composition and structure, may only reach a maximum discharge specific capacity of 170 mAh/g. A discharge voltage platform is usually lower than 3.4 V and has a relatively low electronic conductivity, resulting in poor low-temperature performance and rate performance of the cathode material of lithium iron phosphate ($LiFePO_4$). A cathode material of lithium manganese ferric phosphate ($LiMn_xFe_{1-x}PO_4$) can further improve the discharge voltage platform and thus further increase the energy density of the batteries by replacing Fe with Mn on the basis of $LifePO_4$. However, $LiMn_xFe_{1-x}PO_4$ has a worse electronic conductivity and a more serious dissolution of Mn may occur, which adversely affect the low-temperature performance, rate performance, cycle performance, and safety performance of the batteries. Therefore, $LiMn_xFe_{1-x}PO_4$ has not yet been truly industrialized for application.

SUMMARY

In a first aspect, the present disclosure provides an olivine composite cathode material. The composite cathode material includes a matrix and a composite phase. The matrix has a composition represented by formula I: $Li_xM^1_yMn_zFe_{1-z-u}M^2_n(PO_4)_w(RO_a)_bCv$ (formula I), where: $0.5 \leq x < 1.3$, $0 \leq y \leq 0.5$, $0 < z \leq 1$, $0 \leq u \leq 0.01$, $0 < w \leq 1$, $0 < v \leq 0.05$, $0 \leq a \leq 8$, and $0 \leq b \leq 1$; $M^1$ is selected from at least one element of Mg, Na, and K; $M^2$ is selected from at least one element of Ga, Sn, V, Y, Mo, Al, Mg, Ce, Ti, Zr, Nb, Si, W, and In; and R is selected from at least one element of Si, Cl, Br, S, Sb, and Sn. The composite phase has a composition represented by formula II: $T_mG_n$ (formula II), where $0.1 \leq m \leq 5$, and $0.1 \leq s \leq 5$; T is selected from at least one element of Ti, Mo, Co, W, Zn, Cu, B, V, Nb, Ta, Pd, Cr, Ag, Al, Mn, Sn, Mg, Sc, Zr, and Hf; and G is selected from N and/or C.

In a second aspect, the present disclosure provides a preparation method of the above-mentioned olivine composite cathode material. The preparation method includes: (1) performing a first mixing on a compound containing element T with a compound containing element G to obtain a first mixture, and performing a first heat treatment on the first mixture in the presence of a protective atmosphere to obtain a compound containing elements T and G; (2) performing a second mixing on a lithium source, a carbon source, a phosphorus source, an optional iron source, a manganese source, an optional R source, an optional $M^1$ source, an optional $M^2$ source with a solvent to obtain a second mixture, and grinding the second mixture to obtain a slurry; (3) performing a third mixing on the compound containing elements T and G with the slurry and drying to obtain powder; and (4) performing a second heat treatment on the powder in the presence of a non-oxidizing atmosphere and performing crushing to obtain the olivine composite cathode material.

In a third aspect, the present disclosure provides a lithium-ion battery, the lithium-ion battery including the above-mentioned olivine composite cathode material.

In a fourth aspect, the present disclosure provides a supercapacitor, the supercapacitor including the above-mentioned olivine composite cathode material.

In a fifth aspect, the present disclosure provides a lithium-sulfur battery, the lithium-sulfur battery including the above-mentioned olivine composite cathode material

DETAILED DESCRIPTION

Figure 1A:
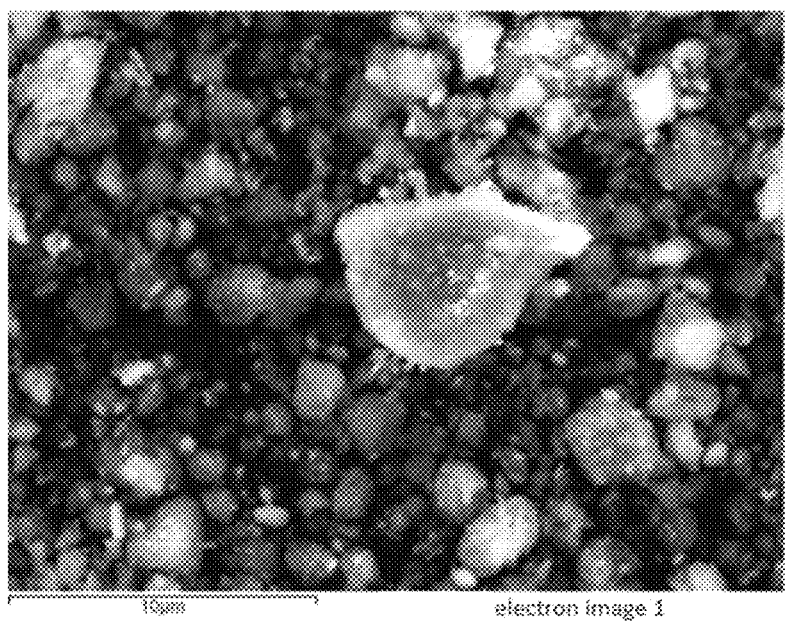
FIGS. 1A and 1B are images of T distribution of a sintered material in Example 3.

Neither endpoints nor any of values of ranges disclosed herein are limited to the exact range or value, and those ranges or values should be understood to include values close to those ranges or values. For numerical ranges, one or more new numerical ranges can be obtained by combining the endpoints of each range, combining an endpoint and an individual point value of each range, or combing individual point values, and these numerical ranges should be deemed to be specifically disclosed herein.

An object of the present disclosure is to overcome the above-mentioned problems existing in the related art. The present disclosure provides an olivine composite cathode material, a preparation method and use thereof, and a lithium-ion battery. The olivine composite cathode material includes a matrix and a composite phase $T_mG_n$. The composite phase is introduced in situ into the cathode material, enabling the composite phase to be uniformly compounded at crystal boundaries and surface of the matrix of the cathode material and to be tightly integrated with the matrix of the cathode material. In this way, the electronic conductivity and surface structure stability of the cathode material during operation can be improved. The composite phase $T_mG_n$ has a metal-like electronic structure and generally exhibits characteristics such as low electrical resistivity ($<10$ $\Omega \cdot cm$), strong chemical adsorption capacity, and stable chemical performance. Therefore, the composite cathode material containing the composite phase can have high conductivity and excellent chemical stability, and it can be applied to the fields of supercapacitors, the lithium-ion batteries, lithium-sulfur batteries, etc. In particular, the lithium-ion battery including the composite cathode material has significantly improved rate performance and cycle life.

In order to achieve the above-mentioned object, in a first aspect, the present disclosure provides an olivine composite cathode material. The composite cathode material includes a matrix and a composite phase. The matrix has a composition represented by formula I: $Li_xM^1{}_yMn_zFe_{1-z-u}M^2{}_u(PO_4)_w$ $(RO_a)_bCv$ (formula I), where: $0.5 \leq x < 1.3$, $0 \leq y \leq 0.5$, $0 < z \leq 1$, $0 \leq u \leq 0.01$, $0 < w \leq 1$, $0 < v \leq 0.05$, $0 \leq a \leq 8$, and $0 \leq b \leq 1$; $M^1$ is selected from at least one element of Mg, Na, and K; $M^2$ is selected from at least one element of Ga, Sn, V, Y, Mo, Al, Mg, Ce, Ti, Zr, Nb, Si, W, and In; and R is selected from at least one element of Si, Cl, Br, S, Sb, and Sn. The composite phase has a composition represented by formula II: $T_mG_n$ (formula II), where $0.1 \leq m \leq 5$, and $0.1 \leq n \leq 5$; T is selected from at least one element of Ti, Mo, Co, W, Zn, Cu, B, V, Nb, Ta, Pd, Cr, Ag, Al, Mn, Sn, Mg, Sc, Zr, and Hf; and G is selected from N and/or C.

In the present disclosure, the olivine composite cathode material includes the matrix and the composite phase $T_mG_n$. The composite phase is introduced in situ into the cathode material, enabling the composite phase to be uniformly compounded at the crystal boundaries and surface of the matrix of the cathode material and to be tightly integrated with the matrix of the cathode material. In this way, the cathode material can have enhanced electronic conductivity and surface structure stability during operation.

Further, the composite phase $T_mG_n$, such as TIN, MON, $Co_3N$, $W_2N$, VN, etc., has a metal-like electronic structure and generally exhibits characteristics such as a low electrical resistivity ($<10$ $\Omega \cdot cm$), a strong chemical adsorption capacity, a stable chemical performance, and the like. Therefore, the composite cathode material containing the composite phase can have high conductivity and excellent chemical stability, and it can be applied to the fields of supercapacitors, lithium-ion batteries, lithium-sulfur batteries, etc. In particular, the lithium-ion battery including the composite cathode material has significantly improved rate performance and cycle life.

Further, in formula I, $0.95 \leq x < 1.1$, $0 < y \leq 0.01$, $0.5 \leq z \leq 1$, $0 < u \leq 0.005$, $0.55 \leq w < 1$; $0.001 < v \leq 0.03$, $0 \leq a \leq 4$, and $0 < b \leq 0.1$.

Further, in formula II, $0.5 \leq m \leq 3$, $1 \leq n \leq 5$, and T is selected from at least one element of Ti, Mo, Co, W, Zn, Cu, B, V, Nb, Ta, Cr, Ag, Al, Mn, Sn, Mg, Sc, and Zr.

According to the present disclosure, based on a total weight of the composite cathode material, a content of the composite phase ranges from 0.01 wt % to 10 wt %.

In the present disclosure, the content of the composite phase in the composite cathode material is measured using an ICP method.

In the present disclosure, when the content of the composite phase in the composite cathode material is within the above-mentioned range, the electronic conductivity and structural stability of an interface of the matrix can be improved, allowing the composite cathode material to have low powder resistivity and excellent surface stability. When the composite cathode material is used in a lithium-ion battery, a rate performance and a cycle performance of the lithium-ion battery can be significantly improved, and an amount of manganese dissolution can be reduced.

Further, based on the total weight of the composite cathode material, the content of the composite phase ranges from 0.01 wt % to 1 wt %.

According to the present disclosure, the composite cathode material has a pellet density ranging from 1.5 $g/cm^3$ to 3 $g/cm^3$ In the present disclosure, the composite cathode material has a high pellet density. When the composite cathode material is used in a lithium-ion battery, more cathode materials can be carried in the same volume, thereby improving capacity and energy density of the battery.

Further, the pellet density of the composite cathode material ranges from 2 $g/cm^3$ to 3 $g/cm^3$ According to the present disclosure, the composite cathode material has an electrical resistivity of $\leq 2,500$ $\Omega/cm$.

In the present disclosure, the composite cathode material has a low electrical resistivity, indicating that the composite cathode material has a high conductivity. As a result, when the composite cathode material is used in a lithium-ion battery, the rate performance and cycle life of the lithium-ion battery can be improved.

Further, the composite cathode material has an electrical resistivity of $\leq 1,000$ $\Omega/cm$.

According to the present disclosure, in the composite cathode material, $0.5 \leq m/n \leq 7$.

In the present disclosure, in the composite cathode material, when m/n is within the above-mentioned range, it indicates that the composite phase of the composite cathode material is a pure phase. In this way, the advantages of the composite phase such as high conductivity and structural stability can be fully utilized, such that the lithium-ion battery including the composite cathode material can have excellent rate performance and cycle performance.

In the present disclosure, in the composite cathode material, a content m of element T is measured by EDS surface scanning, and a content n of element G was measured by EDS surface scanning.

Further, in the composite cathode material, $1 \leq m/n \leq 5$.

According to the present disclosure, the composite cathode material has an average particle size $D_{50}$ ranging from 0.5 $\mu m$ to 20 $\mu m$, and preferably, from 1 $\mu m$ to 15 $\mu m$.

According to the present disclosure, m/n has a standard deviation of $\leq 1\%$ at any position in an EDS elemental analysis of the composite cathode material.

In the present disclosure, in the EDS elemental analysis on the composite cathode material, when the standard deviation of the molar ratio m/n of element T and element G in the composite phase $T_mG_n$ at any position is within the above-mentioned range, it indicates that the composite phase $T_mG_n$ is uniformly compounded in the cathode material and exists in the form of element $T_mG_n$ pure phase. As a result, it can be ensured that the composite phase is partially characterized by a low electrical resistivity and a stable structure, allowing the overall resistivity of the composite cathode material to be maintained at a low level. In this way, smooth flow of electron transmission channels during charging and discharging can be ensured. Meanwhile, the surface structure stability can be ensured, and metal dissolution rate is low. When the composite cathode material is used in a lithium-ion battery, the rate performance and cycle performance of the lithium-ion battery can be significantly improved.

Further, the standard deviation of m/n is ≤0.8%.

In a second aspect, the present disclosure provides a preparation method of an olivine composite cathode material. The preparation method includes: (1) performing a first mixing on a compound containing element T with a compound containing element G to obtain a first mixture, and performing a first heat treatment on the first mixture in the presence of a protective atmosphere to obtain a compound containing elements T and G; (2) performing a second mixing on a lithium source, a carbon source, a phosphorus source, an optional iron source, a manganese source, an optional R source, an optional $M^1$ source, an optional $M^2$ source with a solvent to obtain a second mixture, and grinding the second mixture to obtain a slurry; (3) performing a third mixing on the compound containing elements T and G with the slurry and drying to obtain powder; and (4) performing a second heat treatment on the powder in the presence of a non-oxidizing atmosphere and performing crushing to obtain the olivine composite cathode material.

In the present disclosure, the mixture of the compound containing element T and the compound containing element G is subjected to a heat treatment in the protective atmosphere, and the compound containing elements T and G obtained by the heat treatment is introduced into the olivine composite cathode material. In this way, the composite phase formed by the compound containing elements T and G can be uniformly compounded at the crystal boundaries and surface of the matrix of the cathode material and can be tightly integrated with the matrix of the cathode material, thereby improving the electronic conductivity and the surface structure stability of the cathode material during operation. In addition, the raw materials are derived from abundant sources, and thus the preparation cost is low, facilitating the industrialization of the overall process.

Further, in the preparation method according to the present disclosure, only one sintering is required to complete synthesis of a matrix material, carbon coating, and compounding of the compound containing elements T and G with the matrix material, thereby shortening preparation time of samples, effectively saving energy, and reducing carbon emission.

According to the present disclosure, in step (1), the compound containing element T is selected from at least one of an elementary substance of element T, an oxide of element T, a nitrate of element T, and a hydroxide of element T.

In the present disclosure, a morphology of the oxide of element T is not specifically limited. For example, the oxide of element T may be selected from at least one of nanoparticles, nanosheets, and nanowires.

In the present disclosure, the oxide of element T has an average particle size $D_{50}$ ranging from 0.001 μm to 1 μm.

According to the present disclosure, the compound containing element G is selected from at least one of nitrogen, ammonia, melamine, polydopamine, urea, glucose, starch, sucrose, and graphite;

Further, the compound containing element G is selected from at least one of nitrogen, ammonia, urea, and glucose.

According to the present disclosure, conditions of the first heat treatment include: a heat treatment temperature ranging from 400° C. to 1,000° C., and a heat treatment duration ranging from 2 hours to 8 hours.

In the present disclosure, the first mixture is subjected to the heat treatment under the above-mentioned conditions, enabling the compound containing element T and the compound containing element G to be completely transformed into a pure phase compound containing elements T and G (nitride and/or carbide). In this way, it can be ensured that the composite phase in the composite cathode material prepared by compounding the compound containing elements T and G with the slurry is a pure phase, thereby allowing the prepared composite cathode material to have high conductivity and good structural stability. When the composite cathode material is used in a lithium-ion battery, the rate performance and cycle performance of the lithium-ion battery can be significantly improved.

Further, the conditions of the first heat treatment include: a heat treatment temperature ranging from 500° C. to 800° C., and a heat treatment duration ranging from 4 hours to 10 hours.

.According to the present disclosure, a molar ratio of the compound containing element T in terms of element T to the compound containing element G in terms of element G is (0.5 to 7): 1.

In the present disclosure, when the molar ratio of the compound containing element T to the compound containing element G is within the above-mentioned range, it can be ensured that the composite phase in the composite cathode material prepared by compounding the compound containing elements T and G with the slurry is a pure phase, thereby allowing the prepared composite cathode material to have high conductivity and good structural stability. When the composite cathode material is used in a lithium-ion battery, the rate performance and cycle performance of the lithium-ion battery can be significantly improved.

In the present disclosure, the conditions of the first mixing are not specifically limited, as long as the compound containing element T and the compound containing element G can be fully and uniformly mixed. Preferably, the conditions of the first mixing include: a mixing speed ranging from 100 rpm to 1,000 rpm and a mixing duration ranging from 1 hour to 10 hours.

In the present disclosure, the manner of the first mixing is not specifically limited. The first mixing may be performed with the methods known in the art. In an embodiment, the manner of the first mixing is selected from at least one of mechanical planetary mixing, mechanical high-speed mixing, ball milling, and sanding.

In the present disclosure, a type of the protective atmosphere is not specifically limited. Conventional protective atmospheres in the art, such as nitrogen and/or argon, can be selected and used.

According to the present disclosure, in step (2), the lithium source is selected from at least one of lithium carbonate, lithium hydroxide, lithium oxide, and lithium nitrate.

According to the present disclosure, the phosphorus source is selected from at least one of phosphoric acid, metaphosphoric acid, pyrophosphoric acid, ammonium dihydrogen phosphate, diammonium hydrogen phosphate, and phosphorus oxide.

According to the present disclosure, the carbon source is selected from at least one of glucose, sucrose, starch, graphene, and carbon nanotube.

According to the present disclosure, the iron source is selected from at least one of ferric phosphate, ferrous oxalate, ferric acetate, ferric oxide, and hydroxyl iron oxide.

According to the present disclosure, the manganese source is selected from at least one of manganese oxide, manganese carbonate, and manganese nitrate.

According to the present disclosure, the R source is selected from a compound containing at least one element of Si, Cl, Br, S, Sb, and Sn. In an embodiment, the R source is selected from at least one of an acid containing element R, an oxide containing element R, and a hydroxide containing element R.

According to the present disclosure, the $M^1$ source is selected from a compound containing at least one element of Mg, Na, and K. In an embodiment, the $M^1$ source is selected from at least one of an oxide containing element $M^1$, a hydroxide containing element $M^1$, and a carbonate containing element $M^1$.

According to the present disclosure, the $M^2$ source is selected from a compound containing at least one element of Ga, Sn, V, Y, Mo, Al, Mg, Ce, Ti, Zr, Nb, Si, W, and In. In an embodiment, the $M^2$ source is selected from at least one of an oxide containing element $M^2$, a hydroxide containing element $M^2$, and a carbonate containing element $M^2$.

According to the present disclosure, the solvent is selected from at least one of water, ethanol, methanol, N-methylpyrrolidone (NMP), and isopropanol.

According to the present disclosure, a molar ratio of the lithium source in terms of Li, the phosphorus source in terms of P, the carbon source in terms of C, the iron source in terms of Fe, the manganese resource in terms of Mn, the R source in terms of R, the $M^1$ source in terms of $M^1$, and the $M^2$ source in terms of $M^2$ is (0.5 to 1.3): (0 to 1): (0 to 0.05): (0 to 1): (0 to 1): (0 to 1): (0 to 0.5): (0 to 0.01), and the amount of the phosphorus source, manganese source, and carbon source used is not equal to 0.

In the present disclosure, when the lithium source, the phosphorus source, the carbon source, the iron source, the manganese source, the R source, the $M^1$ source, and the $M^2$ source satisfy the above-mentioned ratio, the prepared composite cathode material can have high ionic conductivity and excellent structural stability. When the composite cathode material is used in a lithium-ion battery, the charge and discharge capacity, rate performance, and cycle performance of the lithium-ion battery can be significantly improved.

Further, the molar ratio of the lithium source in terms of Li, the phosphorus source in terms of P, the carbon source in terms of C, the iron source in terms of Fe, the manganese resource in terms of Mn, the R source in terms of R, the $M^1$ source in terms of $M^1$, and the $M^2$ source in terms of $M^2$ is (0.9 to 1.1): (0.5 to 1): (0.001 to 0.03): (0 to 0.495): (0.5 to 1): (0 to 0.1): (0 to 0.01): (0 to 0.005), and the content of the $M^1$ source, iron source, R source, and $M^2$ source is not equal to 0.

According to the present disclosure, the slurry has a solid content ranging from 10 wt % to 60 wt %.

Further, the solid content of the slurry ranges from 20 wt % to 50 wt %

In the present disclosure, the amount of the solvent used is not specifically limited, as long as the solid content of the slurry is within the above-mentioned range.

According to the present disclosure, the slurry has an average particle size $D_{50}$ ranging from 0.1 μm to 1 μm.

In the present disclosure, when the average particle size $D_{50}$ of the slurry is within the above-mentioned range, an apparent density of powder obtained after drying the slurry and the compound containing elements T and G can be advantageously increased, Furthermore, by controlling the average particle size of the slurry within the above-mentioned range, the slurry is more suitable for spray drying.

Further, the average particle size $D_{50}$ of the slurry ranges from 0.1 μm to 0.8 μm.

In the present disclosure, the conditions of the second mixing are not specifically limited, as long as the lithium source, the phosphorus source, the carbon source, the iron source, the manganese source, the R source, the $M^1$ source, the $M^2$ source, and the solvent may be fully and uniformly mixed.

In the present disclosure, the conditions of grinding are not specifically limited, as long as the average particle size $D_{50}$ of the slurry can be within the above-mentioned range. Preferably, the conditions of the grinding include: a grinding speed ranging from 500 rpm to 2,000 rpm and a grinding duration ranging from 1 hour to 10 hours.

In the present disclosure, the manner of the grinding is not specifically limited. Said grinding may be performed with a method known in the art. In an embodiment, the manner of grinding is selected from at least one of stirred milling, ball milling, and sanding.

In the present disclosure, said grinding includes: grinding the second mixture to obtain the slurry. The equipment for grinding includes one or more of a stirred mill, a ball mill, and a sand mill.

According to the present disclosure, in step (3), a solid-liquid ratio of the compound containing elements T and G to the slurry ranges from 0.000001 g/mL to 10 g/mL.

In the present disclosure, when the solid-liquid ratio of the compound containing elements T and G to the slurry is within the above-mentioned range, the compound containing elements T and G can have good dispersibility in the slurry. As a result, the composite phase and the matrix in the prepared cathode material can be uniformly compounded without aggregation, enabling the lithium-ion battery including the composite cathode material to have more stable electrochemical performance.

Further, the solid-liquid ratio of the compound containing elements T and G to the slurry ranges from 0.000001 g/mL to 1 g/mL.

In the present disclosure, the conditions of the third mixing are not specifically limited, as long as the compound containing elements T and G and the slurry can be fully and uniformly mixed.

In the present disclosure, the conditions of drying and drying equipment are not specifically limited, as long as the mixture of the compound containing elements T and G and the slurry can be fully dried. The drying equipment may be selected from at least one of a spray dryer, a blast oven, a vacuum oven, a freeze dryer and a flash evaporator.

According to the present disclosure, in step (4), conditions of the second heat treatment include: a heat treatment temperature ranging from 400° C. to 1,000° C., and a heat treatment duration ranging from 4 hours to 12 hours.

In the present disclosure, when the powder is subjected to the second heat treatment under the above-mentioned conditions, $T_mG_n$ can be compounded in situ during phase formation of the matrix material, and thus the composite phase $T_mG_n$ and the matrix can be tightly bonded. At the same time, a carbon coating layer can be formed on the surface of the composite phase and the matrix. As a result, the composite cathode material prepared can have high conductivity and excellent cycle performance. When the cathode material is used in a lithium-ion battery, the rate performance and cycle performance of the lithium-ion batteries can be significantly improved.

Further, the conditions of the second heat treatment include: a heat treatment temperature ranging from 500° C. to 900° C., and a heat treatment duration ranging from 6 hours to 10 hours.

In the present disclosure, the type of the non-oxidizing atmosphere is not specifically limited. Conventional non-oxidizing atmospheres in the art, such as nitrogen and/or argon, may be used.

In the present disclosure, the equipment used for the crushing is not specifically limited. Conventional equipment known in the art, such as at least one of a mechanical mill, a colloid mill, and a jet mill, may be used.

In a third aspect, the present disclosure provides an olivine composite cathode material prepared by the above-mentioned preparation method.

In a fourth aspect, the present disclosure provides use of the above-mentioned olivine composite cathode material in at least one of a supercapacitor, a lithium-ion battery, and a lithium-sulfur battery.

In a fifth aspect, the present disclosure provides a lithium-ion battery. The lithium-ion battery includes the above-mentioned olivine composite cathode material.

In the present disclosure, when the olivine composite cathode material is a Mn-containing cathode material, that is, z is not equal to 0, and when the olivine composite cathode material is used in a lithium-ion battery, the lithium-ion battery is a liquid lithium-ion battery. Subsequent to 1,000 cycles at 45° C., an amount of manganese dissolved from a negative electrode of the liquid lithium-ion battery is ≤3000 ppm, and preferably, ranging from 500 ppm to 2,000 ppm.

Based on the above-mentioned technical solutions, the olivine composite cathode material, the preparation method and the use thereof, and the lithium-ion battery according to the present disclosure have the following beneficial effects.

(1) The olivine composite cathode material according to the present disclosure includes the matrix and the composite phase $T_mG_n$. The composite phase is introduced in situ into the cathode material, enabling the composite phase to be uniformly compounded at crystal boundaries and surface of the matrix of the cathode material and to be tightly integrated with the matrix of the cathode material. In this way, the electronic conductivity and surface structure stability of the cathode material during operation can be improved. The cathode material exhibits a low electrical resistivity (<10 Ω·cm), a strong chemical adsorption capacity, and stable chemical performance. Therefore, the composite cathode material can be applied to the fields of supercapacitors, the lithium-ion batteries, lithium-sulfur batteries, etc. In particular, the lithium-ion battery including the composite cathode material has significantly improved rate performance and cycle life.

(2) In the preparation method of the olivine composite cathode material according to the present disclosure, the mixture of the compound containing element T and the compound containing element G is subjected to a heat treatment in the protective atmosphere, and the compound containing elements T and G obtained by the heat treatment is introduced into the olivine composite cathode material. In this way, the composite phase formed by the compound containing elements T and G can be uniformly compounded at the crystal boundaries and surface of the matrix of the cathode material and can be tightly integrated with the matrix of the cathode material, thereby improving the electronic conductivity and the surface structure stability of the cathode material during operation. In addition, the raw materials are derived from abundant sources, and thus the preparation cost is low, facilitating the industrialization of the overall process.

(3) In the preparation method of the olivine composite cathode material according to the present disclosure, only one sintering is required to complete synthesis of a matrix material, carbon coating, and compounding of the compound containing elements T and G with the matrix material, thereby shortening preparation time of samples, effectively saving energy, and reducing carbon emission.

The present disclosure will be described in detail below through examples. In the following examples, the composition of the composite cathode material was measured using an ICP method; the content of the composite phase in the composite cathode material was measured by an ICP method; the pellet density of the composite cathode material was measured using powder pellet density instrument; the electrical resistivity of the composite cathode material was measured using an electrical resistivity instrument; in the composite cathode material, the content of element G was measured by EDS surface scanning and the content and distribution of element T were measured by EDS surface scanning; and the raw materials used in the examples and comparative examples were all commercially available products.

Example 1

(1) 10 g of element $TiO_2$ nanoparticles having an average particle size of 0.05 μm and 80 g of urea were weighed and mixed in a ball milling tank at 600 rpm for 5 hours. The mixture was placed in a tube furnace and subjected to a heat treatment at 550° C. for 10 hours under a nitrogen atmosphere to obtain TiN nanoparticles. A molar ratio of the compound containing element T in terms of element T to the compound containing element G in terms of element G was 1:1.

(2) 24.04 g of lithium carbonate (lithium source), 19.89 g of iron oxide (iron source), 44.12 g of manganese carbonate (manganese source), 73.24 g of ammonium dihydrogen phosphate (phosphorus source), and 14.34 g of glucose (carbon source) were weighed and mixed in 200 g of pure water. The mixture was subjected to ball milling in a planetary ball mill at a rotational speed of 500 rpm for 6 hours to obtain a slurry having $D_{50}$ of 0.62 μm. A molar ratio of the lithium source in terms of Li, the phosphorus source in terms of P, the carbon source in terms of C, the iron source in terms of Fe, and the manganese source in terms of Mn was 1:1:0.1:0.4:0.6. The slurry had a solid content of 45 wt %.

(3) The slurry obtained in step (2) and 0.3 g of element TiN nanoparticles were mechanically stirred for 30 minutes to obtain an evenly dispersed mixed slurry. The mixed slurry was dried in a spray dryer to obtain powder. A solid-liquid ratio of the TiN nanoparticles to the slurry was 0.0001 g/mL.

(4) The powder obtained in step (3) was treated in a tube furnace at 750° C. for 8 hours under a nitrogen atmosphere to obtain a sintered material. The sintered material was crushed by a jet mill to obtain the olivine composite cathode material A1. The amount of the respective materials used and process conditions in the preparation process are shown in Table 1.

Part of the sintered material was taken for plasma beam cutting to obtain a cross section of the material. Distribution uniformity of element Ti in the material was tested by EDS surface scanning. The results are shown in Table 2.

The composition, content of the composite phase, particle size, pellet density, electrical resistivity, and T/G of the olivine composite cathode material A1 were tested, and the results are shown in Table 2.

Example 2

(1) 10 g of $Co_3O_4$ nanosheets having an average particle size of 0.09 μm and 80 g of melamine were weighed and mixed in a ball milling tank at 600 rpm for 5 hours. The mixture was placed in a tube furnace and subjected to a heat treatment at 600° C. for 10 hours under a nitrogen atmosphere to obtain $Co_3N$ nanoparticles. A molar ratio of the compound containing element T in terms of element T to the compound containing element G in terms of element G was 3:1.

(2) 24.04 g of lithium carbonate (lithium source), 95.93 g of ferric phosphate (iron source and phosphorus source), 44.16 g of manganese carbonate (manganese source), 0.04 g of titanium oxide ($M^2$ source), and 14.34 g of glucose (carbon source) were weighed and mixed in 200 g of pure water. The mixture was subjected to ball milling in a planetary ball mill at a rotational speed of 500 rpm for 6 hours to obtain a slurry having $D_{50}$ of 0.48 μm. A molar ratio of the lithium source in terms of Li, the phosphorus source in terms of P, the carbon source in terms of C, the iron source in terms of Fe, the manganese source in terms of Mn, and the $M^2$ source in terms of $M^2$ was 1:1:0.1:0.4:0.599:0.001. The slurry had a solid content of 45 wt %.

(3) The slurry obtained in step (2) and 0.2 g of $Co_3N$ nanoparticles were mechanically stirred for 30 minutes to obtain an evenly dispersed mixed slurry. The mixed slurry was dried in a spray dryer to obtain powder. A solid-liquid ratio of the $Co_3N$ nanoparticles to the slurry was 0.001 g/mL.

(4) The powder obtained in step (3) was treated in a tube furnace at 800° C. for 8 hours under a nitrogen atmosphere to obtain a sintered material. The sintered material was crushed by a jet mill to obtain the olivine composite cathode material A2.

Part of the sintered material was taken for plasma beam cutting to obtain a cross section of the material. Distribution uniformity of element Co in the material was tested by EDS surface scanning. The results are shown in Table 1.

The composition, content of the composite phase, particle size, pellet density, electrical resistivity, and T/G of the olivine composite cathode material A2 were tested, and the results are shown in Table 1.

Example 3

(1) 10 g of $MoO_3$ nanowires having an average particle size of 0.07 μm were weighed and subjected to a heat treatment in a tube furnace at 700° C. for 10 hours under an ammonia atmosphere to obtain MON nanoparticles. A molar ratio of the compound containing element T in terms of element T to the compound containing element G in terms of element G was 1:1.

(2) 24.28 g of lithium carbonate (lithium source), 99.96 g of ferric nitrate (iron source), 132.83 g of manganese nitrate (manganese source), 73.52 g of phosphoric acid (phosphorus source), 0.17 g of niobium oxide ($M^2$ source), and 62.52 g of glucose (carbon source) were weighed and mixed in 200 g of pure water. The mixture was stirred in a mechanical mixer at a rotational speed of 300 rpm for 6 hours to obtain a slurry. A molar ratio of the lithium source in terms of Li, the phosphorus source in terms of P, the carbon source in terms of C, the iron source in terms of Fe, the manganese source in terms of Mn, and the $M^2$ source in terms of $M^2$ was 1:1:0.1:0.398:0.6:0.002. The slurry had a solid content of 45 wt %.

(3) The slurry obtained in step (2) and 0.5 g of MON nanoparticles were mechanically stirred for 30 minutes to obtain an evenly dispersed mixed slurry. The mixed slurry was dried in a vacuum oven to obtain a dry gel powder. A solid-liquid ratio of the MON nanoparticles to the slurry was 0.0001 g/mL.

(4) The powder obtained in step (3) was treated in a tube furnace at 760° C. for 8 hours under a nitrogen atmosphere to obtain a sintered material. The sintered material was crushed by a jet mill to obtain the olivine composite cathode material A3.

Part of the sintered material was taken for plasma beam cutting to obtain a cross section of the material. Distribution uniformity of Mo element in the material was tested by EDS surface scanning. The results are shown in Table 1.

The composition, content of the composite phase, particle size, pellet density, electrical resistivity, and T/G of the olivine composite cathode material A3 were tested, and the results are shown in Table 1.

Example 4

(1) 10 g of $V_2O_5$ nanoparticles having an average particle size of 0.05 μm and 20 g of urea were weighed and mixed in a ball milling tank at 600 rpm for 5 hours. The mixture was placed in a tube furnace and subjected to a heat treatment at 550° C. for 10 hours under an ammonia atmosphere to obtain VN nanoparticles. A molar ratio of the compound containing element T in terms of element T to the compound containing element G in terms of element G was 1:1.

(2) 24.04 g of lithium carbonate (lithium source), 95.58 g of ammonium manganese ferrous phosphate (phosphorus source, iron source, and manganese source), 14.34 g of glucose (carbon source), 0.06 g of magnesium carbonate ($M^1$ source), and 0.17 g of niobium oxide ($M^2$ source) were weighed and mixed in 200 g of pure water. The mixture was subjected to ball milling in a planetary ball mill at a rotational speed of 500 rpm for 6 hours to obtain a slurry having $D_{50}$ of 0.62 μm. A molar ratio of the lithium source in terms of Li, the phosphorus source in terms of P, the carbon source in terms of C, the iron source in terms of Fe, the manganese source in terms of Mn, the $M^1$ source in terms of $M^1$, and the $M^2$ source in terms of $M^2$ was 1:1:0.1:0.398:0.6:0.001:0.002. The slurry had a solid content of 45 wt %.

(3) The slurry obtained in step (2) and 0.3 g of VN nanoparticles were mechanically stirred for 30 minutes to obtain an evenly dispersed mixed slurry. The mixed slurry was dried in a spray dryer to obtain powder. A solid-liquid ratio of the VN nanoparticles to the slurry was 0.0001 g/mL.

(4) The powder obtained in step (3) was treated in a tube furnace at 750° C. for 8 hours under a nitrogen atmosphere to obtain a sintered material. The sintered material was crushed by a jet mill to obtain the olivine composite cathode material A4.

Part of the sintered material was taken for plasma beam cutting to obtain a cross section of the material. Distribution uniformity of V element in the material was tested by EDS surface scanning. The results are shown in Table 1.

The composition, content of the composite phase, particle size, pellet density, electrical resistivity, and T/G of the olivine composite cathode material A4 were tested, and the results are shown in Table 1.

Example 5

(1) $B_2O_3$ nanosheets having an average particle size of 0.09 μm were mixed with glucose in a ball milling tank at 600 rpm for 5 hours. The mixture was placed in a tube furnace and subjected to a heat treatment at 1800° C. for 5 hours under a nitrogen atmosphere to obtain $B_4C$ nanoparticles. A molar ratio of the compound containing element T in terms of element T to the compound containing element G in terms of element G was 4:1.

(2) 24.04 g of lithium carbonate (lithium source), 111.92 g of ferric phosphate (iron source and phosphorus source), 33.12 g of manganese carbonate (manganese source), 0.04 g of titanium oxide ($M^2$ source), and 14.34 g of glucose (carbon source) were weighed and mixed in 200 g of pure water. The mixture was subjected to ball milling in a planetary ball mill at a rotational speed of 500 rpm for 6 hours to obtain a slurry having $D_{50}$ of 0.48 μm. A molar ratio of the lithium source in terms of Li, the phosphorus source in terms of P, the carbon source in terms of C, the iron source in terms of Fe, the manganese source in terms of Mn, and the $M^2$ source in terms of $M^2$ was 1:1:0.1:0.3:0.699:0.001. The slurry had a solid content of 45 wt %.

(3) The slurry obtained in step (2) and 0.2 g of $B_4C$ nanoparticles were mechanically stirred for 30 minutes to obtain an evenly dispersed mixed slurry. The mixed slurry was dried in a spray dryer to obtain powder. A solid-liquid ratio of the $B_4C$ nanoparticles to the slurry was 0.00015 g/mL.

(4) The powder obtained in step (3) was treated in a tube furnace at 800° C. for 8 hours under a nitrogen atmosphere to obtain a sintered material. The sintered material was crushed by a jet mill to obtain the olivine composite cathode material A5.

Part of the sintered material was taken for plasma beam cutting to obtain a cross section of the material. Distribution uniformity of B element in the material was tested by EDS surface scanning. The results are shown in Table 1.

The composition, content of the composite phase, particle size, pellet density, electrical resistivity, and T/G of the olivine composite cathode material A5 were tested, and the results are shown in Table 1.

Example 6

(1) 10 g of element $TiO_2$ nanoparticles having an average particle size of 0.05 μm and 80 g of urea were weighed and mixed in a ball milling tank at 600 rpm for 5 hours. The mixture was placed in a tube furnace and subjected to a heat treatment at 550° C. for 10 hours under a nitrogen atmosphere to obtain TiN nanoparticles. A molar ratio of the compound containing element T in terms of element T to the compound containing element G in terms of element G was 1:1.

(2) 10 g of element $TiO_2$ nanoparticles having an average particle size of 0.05 μm were weighed and mixed with 100 g of glucose in a ball milling tank at 600 rpm for 5 hours. The mixture was placed in a tube furnace and subjected to a heat treatment at 550° C. for 10 hours under a nitrogen atmosphere to obtain TiN nanoparticles. A molar ratio of the compound containing element T in terms of element T to the compound containing element G in terms of element G was 1:1.

(3) 24.04 g of lithium carbonate (lithium source), 19.89 g of iron oxide (iron source), 44.12 g of manganese carbonate (manganese source), 72.5 g of ammonium dihydrogen phosphate (phosphorus source), 0.6 g of silicon dioxide (R source), and 14.34 g of glucose (carbon source) were weighed and mixed in 200 g of pure water. The mixture was subjected to ball milling in a planetary ball mill at a rotational speed of 500 rpm for 6 hours to obtain a slurry having $D_{50}$ of 0.62 μm. A molar ratio of the lithium source in terms of Li, the phosphorus source in terms of P, the carbon source in terms of C, the iron source in terms of Fe, the manganese source in terms of Mn, and the R source in terms of R was 1:1:0.1:0.4:0.6:0.01. The slurry had a solid content of 45 wt %.

(4) The slurry obtained in step (2), 0.15 g of element TiN nanoparticles, and 0.15 g of element TiC nanoparticles were mechanically stirred for 30 minutes to obtain an evenly dispersed mixed slurry. The mixed slurry was dried in a spray dryer to obtain powder. A solid-liquid ratio of the TiN/TiC nanoparticles to the slurry was 0.0001 g/mL.

(5) The olivine composite cathode material A6 was obtained in the same manner as step (1) in Example 1.

Part of the sintered material was taken for plasma beam cutting to obtain a cross section of the material. Distribution uniformity of element Ti in the material was tested by EDS surface scanning. The results are shown in Table 1.

The composition, content of the composite phase, particle size, pellet density, electrical resistivity, and T/G of the olivine composite cathode material A6 were tested, and the results are shown in Table 1.

Comparative Example 1

The cathode material was prepared according to the method in Example 1. Comparative Example 1 differed from Example 1 in that: step (1) was omitted; and TIN nanoparticles were not added in step (3).

The olivine cathode material D1 was obtained. The composition, content of the composite phase, particle size, pellet density, and electrical resistivity of the olivine composite cathode material D1 were tested, and the results are shown in Table 1.

Comparative Example 2

The cathode material was prepared according to the method in Example 1. Comparative Example 2 differed from Example 1 in the following aspects:

step (1) was omitted;

in step (2), 24.04 g of lithium carbonate (lithium source), 95.93 g of ferric phosphate (iron source and phosphorus source), 44.08 g of manganese carbonate (manganese source), 0.05 g of calcium oxide (Ca), and 14.34 g of glucose (carbon source) were weighed and mixed in 200 g of pure water; the mixture was subjected to ball milling in a planetary ball mill at a rotational speed of 500 rpm for 6 hours to obtain a slurry having $D_{50}$ of 0.62 μm; a molar ratio of the lithium source in terms of Li, the phosphorus source in terms of P, the carbon source in terms of C, the iron source in terms of Fe, the manganese source in terms of Mn, and the calcium oxide in terms of Ca was 1:1:0.1:0.4:0.6:0.0001; and the slurry had a solid content of 30 wt %; and TiN nanoparticles were not added in step (3).

The olivine cathode material D2 was obtained.

The composition, content of the composite phase, particle size, pellet density, and electrical resistivity of the olivine composite cathode material D2 were tested, and the results are shown in Table 1.

Comparative Example 3

The cathode material was prepared according to the method in Example 1.

Step (1) was the same as step (1) in Example 1.

In step (2): 24.28 g of lithium carbonate (lithium source), 99.96 g of ferric nitrate (iron source), 132.83 g of manganese nitrate (manganese source), 73.52 g of phosphoric acid (phosphorus source), 0.33 g of barium nitrate (Ba), and 62.52 g of glucose (carbon source) were weighed and mixed in 200 g of pure water. The mixture was stirred in a mechanical mixer at 300 rpm for 6 hours to obtain a slurry. A molar ratio of the lithium source in terms of Li, the phosphorus source in terms of P, the carbon source in terms of C, the iron source in terms of Fe, the manganese source in terms of Mn, and the barium nitrate in terms of Ba was 1:1:0.1:0.4:0.6:0.0008. The slurry had a solid content of 45 wt %.

The step (3) in Example 1 was omitted.

In step (4), the conditions of the second heat treatment were as follows. The slurry was treated at 750° C. for 8 hours to obtain a sintered material. The sintered material was crushed by a jet mill to obtain a crushed material having an average particle size $D_{50}$ of 1.5 μm and a chemical formula of $LiMn_{0.6}Fe_{0.398}Ba_{0.002}PO_4 C_{0.1}$.

Step (5): The crushed material $LiMn_{0.6}Fe_{0.398}Ba_{0.002}PO_4 C_{0.1}$ obtained in step (4) and the TiN nanoparticles obtained in step (1) were mixed in a ball milling tank at a rotational speed of 850 rpm for 4 hours to obtain a mixture. The mixture was subjected to a heat treatment at 600° C. for 4 hours under a nitrogen atmosphere. Finally, an olivine cathode material D3 having a chemical formula of $LiMn_{0.6}Fe_{0.398}Ba_{0.002}PO_4C_{0.1}@TIN$ was obtained. Relative to the crushed material $LiMn_{0.6}Fe_{0.398}Ba_{0.002}PO_4C_{0.1}$, an amount of element TiN nanoparticles used was 15 wt %.

A part of the material was taken for EDS surface scanning to test distribution uniformity of element Ti in the material, and the results are shown in Table 1.

The composition, content of the composite phase, particle size, pellet density, electrical resistivity, and T/G of the olivine composite cathode material D3 were tested, and the results are shown in Table 1.

As revealed in Table 1, compared with Comparative Example 1 to Comparative Example 3, the prepared cathode materials in Example 1 to Example 6 have high pellet density and low electrical resistivity. Particularly, the pellet density is generally higher than 2 g/cm³, and the electrical resistivity is lower than 500 Ω·cm. At the same time, element T is uniformly distributed in the prepared cathode materials in Example 1 to Example 6. Therefore, the lithium-ion batteries obtained by assembling the above cathode materials can have excellent electrical performance, in particular high rate performance. In contrast, the electrical resistivity of the prepared cathode materials in Comparative Example 1 to Comparative Example 3 is higher than 2,500 Ω·cm, and element Ti is unevenly distributed. The lithium-ion batteries obtained by assembling these cathode materials may have poorer electrical performance and serious deterioration of the rate performance.

Figure 1B:
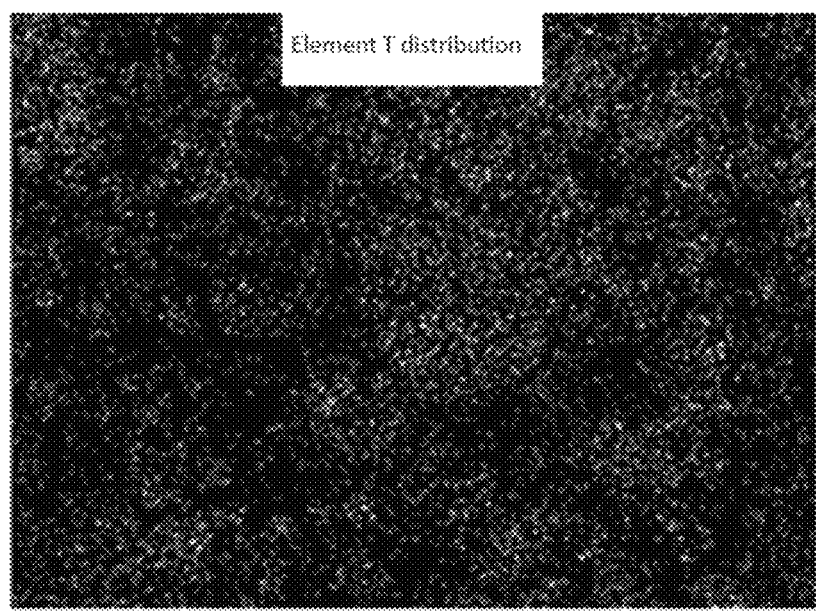
Figure 2A:
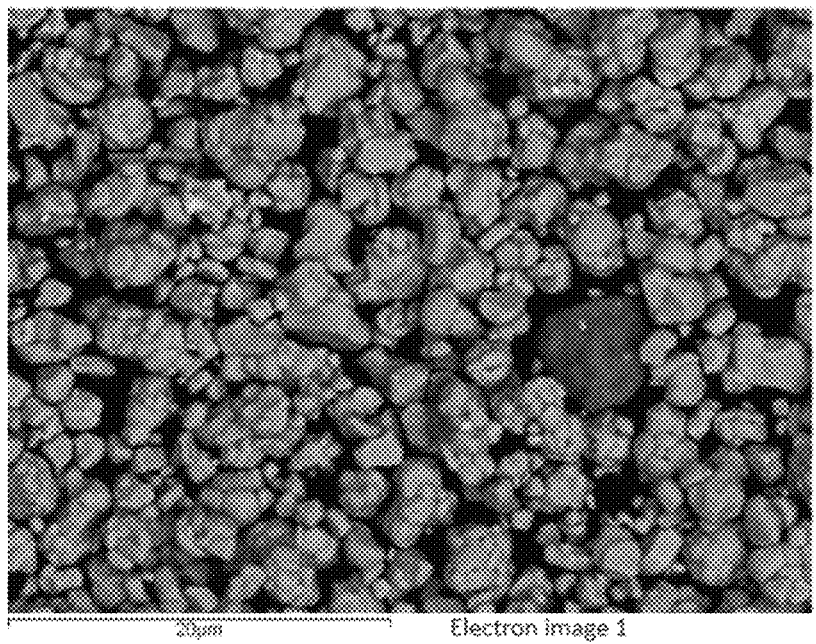
FIG. 2A and FIG. 2B are images of T distribution of a sintered material in Comparative Example 3.
Figure 2B:
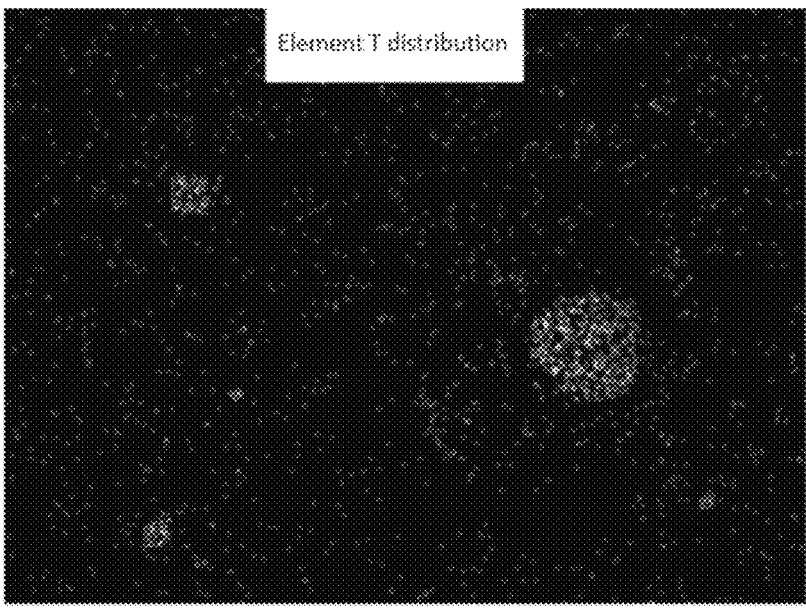

FIG. 1A and FIG. 1B are images of T distribution of a sintered material in Example 3, and FIG. 2A and FIG. 2B are images of T distribution of a sintered material in Comparative Example 3. As reveled in FIG. 1A, FIG. 1B, FIG. 2A, and FIG. 2B, element N was uniformly distributed in FIG. 1A and FIG. 1B, while element N was not uniformly distributed in FIG. 2A and FIG. 2B with a lot of agglomerated parts. It indicates that the composite phase of the samples prepared according to the present disclosure was uniformly distributed in the matrix, having a higher capability in improving transportation of surface electron and the surface structure stability.

Test Example 1

Preparation method of liquid lithium-ion battery: each of the olivine cathode material in examples and comparative examples, acetylene black, and polyvinylidene fluoride

TABLE 1

| Item | Matrix | Composite phase | Content of composite phase/wt % | $D_{50}$ μm | Compacted density g/cm³ |
|---|---|---|---|---|---|
| Example 1 | $LiMn_{0.6}Fe_{0.4}PO_4C_{0.1}$ | TiN | 0.3 | 1.5 | 2.1 |
| Example 2 | $LiMn_{0.599}Fe_{0.4}Ti_{0.001}PO_4C_{0.1}$ | $Co_3N$ | 0.2 | 1.3 | 2.3 |
| Example 3 | $LiMn_{0.6}Fe_{0.398}Nb_{0.002}PO_4C_{0.1}$ | MoN | 0.5 | 1.2 | 2.0 |
| Example 4 | $Li_{0.999}Mg_{0.001}Mn_{0.6}Fe_{0.398}Nb_{0.002}PO_4C_{0.1}$ | VN | 0.3 | 1.5 | 2.2 |
| Example 5 | $LiMn_{0.699}Fe_{0.3}Ti_{0.001}PO_4C_{0.1}$ | $B_4C$ | 0.2 | 1.3 | 2.3 |
| Example 6 | $LiMn_{0.6}Fe_{0.4}(PO_4)_{0.99}(SiO_3)_{0.01}C_{0.1}$ | TiN + TiC | 0.3 | 1.4 | 2.1 |
| Comparative Example 1 | $LiMn_{0.6}Fe_{0.4}PO_4C_{0.1}$ | / | | 1.5 | 1.8 |
| Comparative Example 2 | $LiMn_{0.6}Fe_{0.4}PO_4C_{0.1}$ | / | | 1.3 | 2.0 |
| Comparative Example 3 | $LiMn_{0.6}Fe_{0.398}Ba_{0.002}PO_4C_{0.1}$ | TiN | 15 | 1.2 | 1.7 |

| Item | Electrical resistivity Ω · cm | T distribution of sintered material | T/G | Standard deviation of m/n/% |
|---|---|---|---|---|
| Example 1 | 349 | Uniform | 1 | 0.21 |
| Example 2 | 325 | Uniform | 3 | 0.35 |
| Example 3 | 278 | Uniform | 1 | 0.20 |
| Example 4 | 233 | Uniform | 1 | 0.19 |
| Example 5 | 312 | Uniform | 4 | 0.15 |
| Example 6 | 330 | Uniform | 0.5/0.5 | 0.23 |
| Comparative Example 1 | 4874 | None | / | / |
| Comparative Example 2 | 4265 | None | / | / |
| Comparative Example 3 | 2938 | Uneven | 1 | 2.55 |

(PVDF) were mixed at a mass ratio of 90:5:5, and the mixture was coated on an aluminum foil and dried, which was punched into a positive electrode plate having a diameter of 12 mm and a thickness of 120 μm with a pressure of 100 MPa. Then, the positive electrode plate was placed in a vacuum drying oven and dried at 120° C. for 12 hours. A Li metal plate having a diameter of 17 mm and a thickness of 1 mm was used as a negative electrode. A porous film Celgard 2400 having a thickness of 25 μm was used as a separator. A mixture containing an equal amount of 1 mol/L $LiPF_6$, ethylene carbonate (EC), and diethyl carbonate (DEC) was used as an electrolyte. The positive electrode plate, separator, negative electrode plate, and electrolyte were assembled into a button battery of 2025 type in an Ar gas glove box having a water content and an oxygen content of less than 5 ppm. The assembled button battery was tested at 25° C. for capacity at 0.1 C and 2 C rates and cycled for 100 cycles at 1 C rate. The results are shown in Table 2.

TABLE 2

| | Liquid battery I | | |
| --- | --- | --- | --- |
| Item | 0.1 C discharge specific capacity mAh/g | 2 C discharge specific capacity mAh/g | 1 C capacity retention rate for 100 cycles % |
| Example1 | 136.4 | 114.3 | 90.5 |
| Example2 | 145.4 | 129.2 | 92.6 |
| Example3 | 155.2 | 142.7 | 95.1 |
| Example4 | 161 | 155.4 | 95.9 |
| Example5 | 144.5 | 130.4 | 92.5 |
| Example6 | 135.5 | 115.4 | 90.4 |
| Comparative Example1 | 93.1 | 30.4 | 74.2 |
| Comparative Example2 | 114.3 | 86.1 | 76.5 |
| Comparative Example3 | 125.8 | 100.3 | 80.1 |

Figure 3:
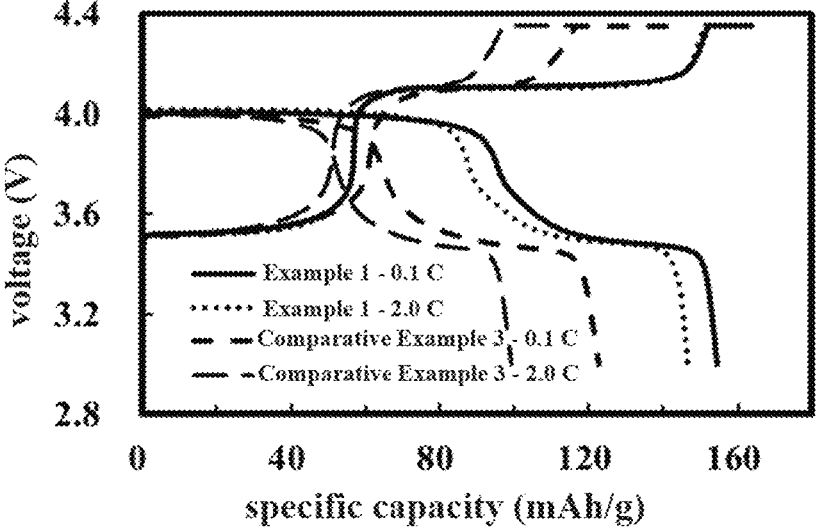
FIG. 3 is a graph of rate charge-discharge curves at 0.1 C and 2 C of a liquid ion battery obtained by assembling cathode materials in Comparative Example 3 and Example 3.
Figure 4:
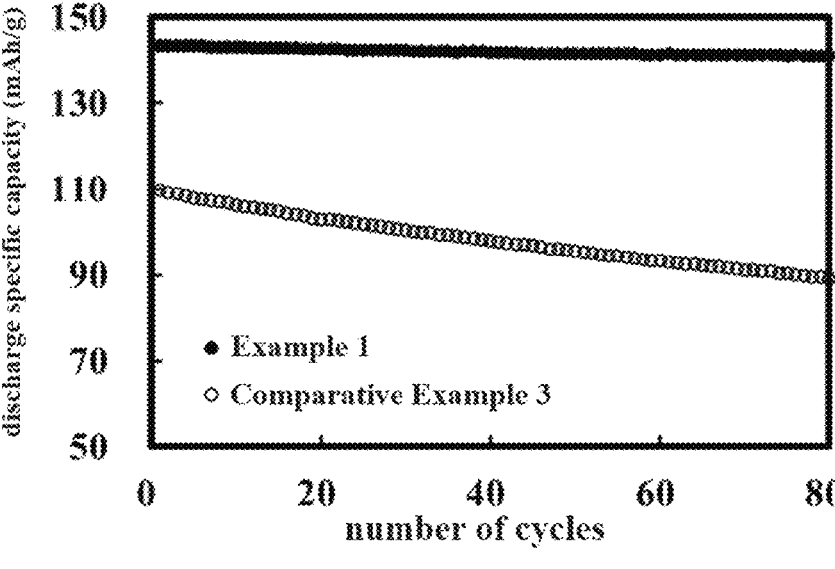
FIG. 4 is a cycle performance graph at 1 C of a liquid ion battery obtained by assembling cathode materials in Comparative Example 3 and Example 3.

FIG. 3 is a graph of rate charge-discharge curves at 0.1 C and 2 C of a liquid ion battery obtained by assembling cathode materials in Comparative Example 3 and Example 3. FIG. 4 is a cycle performance graph at 1 C of a liquid ion battery obtained by assembling cathode materials in Comparative Example 3 and Example 3. As revealed in Table 2, FIG. 3, and FIG. 4, the liquid lithium-ion batteries obtained by assembling the prepared cathode materials in examples of the present disclosure have significantly superior discharge capacity, high rate, and cycle retention rate over the liquid lithium-ion batteries obtained by assembling the prepared cathode materials in comparative examples.

Test Example 2

Preparation method of all-solid-state lithium battery: each of the olivine cathode material in examples and comparative examples, conductive carbon black, and polyvinylidene fluoride (PVDF) were mixed at a mass ratio of 90:5:5, and an appropriate amount of NMP was added. The mixture was uniformly stirred and then coated on an aluminum foil, dried in a blast oven at 120° C. for 1 hour, and punched into a positive electrode plate having a diameter of 11. Metal Li was taken as a negative electrode, and a PEO-based solid electrolyte film was taken as an electrolyte. The prepared positive electrode plate, the composite electrolyte film, and the negative electrode were assembled into a button battery of 2025 type in an Ar gas glove box having a water content and an oxygen content of less than 5 ppm. The assembled button battery was tested at 25° C. for capacity at 2 C rate and cycled for 100 cycles at 1 C rate. The results are shown in Table 3.

TABLE 3

| | Solid battery | |
| --- | --- | --- |
| Item | 2C discharge specific capacity mAh/g | Capacity retention rate for 100 cycles % |
| Example 1 | 110.2 | 90.4 |
| Example 2 | 126.5 | 92.7 |
| Example 3 | 140.8 | 95.1 |
| Example 4 | 155 | 96 |
| Example 5 | 125.6 | 91.5 |
| Example 6 | 111.3 | 91.4 |
| Comparative Example 1 | 10.2 | 70.4 |
| Comparative Example 2 | 71.4 | 73.5 |
| Comparative Example 3 | 91.5 | 88.6 |

As revealed in Table 3, the high rate and cycle retention rate of the solid-state lithium-ion batteries obtained by assembling the prepared cathode materials in examples were significantly better than those of the solid-state lithium-ion batteries obtained by assembling the prepared cathode materials in the comparative examples.

Test Example 3

Preparation method of liquid lithium-ion battery: a cathode material, acetylene black, and polyvinylidene fluoride (PVDF) were mixed according to a mass ratio of 90:5:5, coated on an aluminum foil and dried, and punched into a positive electrode plate having a diameter of 12 mm and a thickness of 120 μm with a pressure of 100 MPa. Then, the positive electrode plate was placed in a vacuum drying oven and dried at 120° C. for 12 hours. A conventional graphite negative electrode was used as a negative electrode. A porous film Celgard 2400 having a thickness of 25 μm was used as a separator. A mixture containing an equal amount of 1 mol/L $LiPF_6$, ethylene carbonate (EC), and diethyl carbonate (DEC) was used as an electrolyte. The positive electrode plate, separator, negative electrode plate, and electrolyte were assembled into a button battery of 2025 type in an Ar gas glove box having a water content and an oxygen content of less than 5 ppm. The assembled button battery was cycled for 100 cycles at 1 C rate and at 45° C. Subsequent to 100 cycles, the negative electrode was obtained by disassemble of the battery. A content of manganese in the negative electrode was tested by ICP. The results are shown in Table 4.

TABLE 4

| Item | Content of manganese dissolved from negative electrode subsequent to 1,000 cycles at 45° C. and 1 C, ppm |
| --- | --- |
| Example 1 | 1820 |
| Example 2 | 1840 |
| Example 3 | 1850 |
| Example 4 | 1800 |
| Example 5 | 1950 |
| Example 6 | 1800 |
| Comparative Example 1 | 8450 |
| Comparative Example 2 | 8430 |
| Comparative Example 3 | 5960 |

As revealed in Table 4, the amount of dissolved Mn in the liquid lithium-ion batteries obtained by assembling the prepared cathode materials in examples were significantly lower than that in the liquid lithium-ion batteries obtained by assembling the prepared cathode materials in the comparative examples.

Although the preferred embodiments of the present disclosure are described in detail above, the present disclosure is not limited thereto. Within the scope of technical concept of the present disclosure, a variety of simple variations may be made to the technical solution of the present disclosure, including the combination of various technical features in any other suitable manner. These simple variations and combinations shall be regarded as the contents disclosed by the present disclosure, and they shall all fall within the scope of protection of the present disclosure.

What is claimed is:

1. An olivine composite cathode material, comprising:
a matrix; and
a composite phase;
wherein the matrix has a composition represented by formula I:

$Li_xM^1{}_yMn_zFe_{1-z-u}M^2{}_u(PO_4)_w$   $(RO_a)_b$   Cv    formula I,
where:
$0.5 \leq x < 1.3$, $0 \leq y \leq 0.5$, $0 < z \leq 1$, $0 \leq u \leq 0.01$, $0 < w \leq 1$, $0 < v \leq 0.05$, $0 \leq a \leq 8$, $0 < b \leq 1$, and $0.3 \leq 1-z-u < 0.4$;
$M^1$ is selected from at least one element of Mg, Na, and K;
$M^2$ is selected from at least one element of Ga, Sn, V, Y, Mo, Al, Mg, Ce, Ti, Zr, Nb, Si, W, and In; and
R is selected from at least one element of Si, Cl, Br, S, Sb, and Sn; and
wherein the composite phase has a composition represented by formula II:

$T_mG_n$ formula II, where:
$0.1 \leq m \leq 5$, and $0.1 \leq n \leq 5$;
T is selected from at least one element of Ti, Mo, Co, W, Zn, Cu, B, V, Nb, Ta, Pd, Cr, Ag, Al, Mn, Sn, Mg, Sc, Zr, and Hf, and
G is selected from N, or N and C.

2. The olivine composite cathode material according to claim 1, wherein:
in formula I, $0.9 \leq x < 1.1$, $0 < y \leq 0.01$, $0.5 \leq z \leq 1$, $0 < u \leq 0.005$, $0.5 \leq w < 1$, $0.001 < v \leq 0.03$, $0 \leq a \leq 4$, and $0 < b \leq 0.1$; and
in formula II, $0.5 \leq m \leq 3$, $1 \leq n \leq 5$, and T is selected from at least one element of Ti, Mo, Co, W, Zn, Cu, B, V, Nb, Ta, Cr, Ag, Al, Mn, Sn, Mg, Sc, and Zr.

3. The olivine composite cathode material according to claim 1, wherein based on a total weight of the composite cathode material, a content of the composite phase ranges from 0.01 wt % to 10 wt %.

4. The olivine composite cathode material according to claim 1, wherein:
the composite cathode material has a pellet density ranging from 1.5 g/cm³ to 3 g/cm³.

5. A preparation method of the olivine composite cathode material according to claim 1, the preparation method comprising:
(1) performing a first mixing on a compound containing element T with a compound containing element G to obtain a first mixture, and performing a first heat treatment on the first mixture in the presence of a protective atmosphere to obtain a compound containing elements T and G;
(2) performing a second mixing on a lithium source, a carbon source, a phosphorus source, an optional iron source, a manganese source, an optional R source, an optional $M^1$ source, an optional $M^2$ source with a solvent to obtain a second mixture, and grinding the second mixture to obtain a slurry;
(3) performing a third mixing on the compound containing elements T and G with the slurry and drying to obtain powder; and
(4) performing a second heat treatment on the powder in the presence of a non-oxidizing atmosphere and performing crushing to obtain the olivine composite cathode material, wherein:
in step (1), the compound containing element T is selected from at least one of an elementary substance of element T, an oxide of element T, a nitrate of element T, and a hydroxide of element T; and
the compound containing element G is selected from at least one of nitrogen, ammonia, melamine, polydopamine, and urea; or the compound containing element G is selected from at least one of nitrogen, ammonia, melamine, polydopamine and urea and at least one of glucose, starch, sucrose, and graphite.

6. The preparation method according to claim 5, wherein:
conditions of the first heat treatment comprise: a heat treatment temperature ranging from 400° C. to 1,000° C., and a heat treatment duration ranging from 2 hours to 8 hours; and
a molar ratio of the compound containing element T in terms of element T to the compound containing element G in terms of element G is (0.5 to 7): 1.

7. The preparation method according to claim 5, wherein:
in step (2), the lithium source is selected from at least one of lithium carbonate, lithium hydroxide, lithium oxide, and lithium nitrate;
the phosphorus source is selected from at least one of phosphoric acid, metaphosphoric acid, pyrophosphoric acid, ammonium dihydrogen phosphate, diammonium hydrogen phosphate, and phosphorus oxide;
the carbon source is selected from at least one of glucose, sucrose, starch, graphene, and carbon nanotube;
the iron source is selected from at least one of ferric phosphate, ferrous oxalate, ferric acetate, ferric oxide, and hydroxyl iron oxide;
the manganese source is selected from at least one of manganese oxide, manganese carbonate, and manganese nitrate;
the R source is selected from a compound containing at least one element of Si, Cl, Br, S, Sb, and Sn;
the $M^1$ source is selected from a compound containing at least one element of Mg, Na, and K;
the $M^2$ source is selected from a compound containing at least one element of Ga, Sn, V, Y, Mo, Al, Mg, Ce, Ti, Zr, Nb, Si, W, and In,
the solvent is selected from at least one of water, ethanol, methanol, N-methylpyrrolidone (NMP), and isopropanol; and
a molar ratio of the lithium source in terms of Li, the phosphorus source in terms of P, the carbon source in terms of C, the iron source in terms of Fe, the manganese resource in terms of Mn, the R source in terms of R, the $M^1$ source in terms of $M^1$, and the $M^2$ source in terms of $M^2$ is (0.5 to 1.3): (0 to 1): (0 to 0.05): (0 to 1): (0 to 1): (0 to 1): (0 to 0.5): (0 to 0.01).

8. The preparation method according to claim 5, wherein:
in step (3), a solid-liquid ratio of the compound containing elements T and G to the slurry ranges from 0.000001 g/mL to 10 g/mL; and in step (4), conditions of the second heat treatment comprise: a heat treatment temperature ranging from 400° C. to 1,000° C., and a heat treatment duration ranging from 4 hours to 12 hours.

9. A lithium-ion battery, comprising an olivine composite cathode material, the olivine composite cathode material comprising:

a matrix; and a composite phase;

wherein the matrix has a composition represented by formula I:

$Li_xM^1_yMn_zFe_{1-z-u}M^2_u(PO_4)_w(RO_a)_bCv$ formula I, where: $0.5 \leq x < 1.3$, $0 \leq y \leq 0.5$, $0 < z \leq 1$, $0 \leq u \leq 0.01$, $0 < w \leq 1$, $0 < v \leq 0.05$, $0 \leq a \leq 8$, $0 \leq b \leq 1$, and $0.3 \leq 1-z-u \leq 0.4$;

$M^1$ is selected from at least one element of Mg, Na, and K;

$M^2$ is selected from at least one element of Ga, Sn, V, Y, Mo, Al, Mg, Ce, Ti, Zr, Nb, Si, W, and In; and R is selected from at least one element of Si, Cl, Br, S, Sb, and Sn; and wherein the composite phase has a composition represented by formula II:

$T_mG_n$ formula II, where:

$0.1 \leq m \leq 5$, and $0.1 \leq n \leq 5$;

T is selected from at least one element of Ti, Mo, Co, W, Zn, Cu, B, V, Nb, Ta, Pd, Cr, Ag, Al, Mn, Sn, Mg, Sc, Zr, and Hf; and G is selected from N, or N and C.

10. The lithium-ion battery according to claim 9, wherein: the lithium-ion battery is a liquid lithium-ion battery; and subsequent to 1,000 cycles at 45° C., an amount of manganese dissolved from a negative electrode of the liquid lithium-ion battery is $\leq 3000$ ppm.

11. The lithium-ion battery according to claim 9, wherein: in formula I, $0.9 \leq x < 1.1$, $0 < y \leq 0.01$, $0.5 \leq z \leq 1$, $0 < u \leq 0.005$, $0.5 \leq w < 1$, $0.001 < v \leq 0.03$, $0 \leq a \leq 4$, and $0 < b \leq 0.1$; and in formula II, $0.5 \leq m \leq 3$, $1 \leq n \leq 5$, and T is selected from at least one element of Ti, Mo, Co, W, Zn, Cu, B, V, Nb, Ta, Cr, Ag, Al, Mn, Sn, Mg, Sc, and Zr.

12. The lithium-ion battery according to claim 9, wherein based on a total weight of the composite cathode material, a content of the composite phase ranges from 0.01 wt % to 10 wt %.

13. The lithium-ion battery according to claim 9, wherein:

the composite cathode material has a pellet density ranging from 1.5 g/cm³ to 3 g/cm³;

the composite cathode material has an electrical resistivity of $\leq 2,500$ Ω/cm;

in the composite cathode material, $0.5 \leq m/n \leq 7$;

the composite cathode material has an average particle size $D_{50}$ ranging from 0.5 μm to 20 μm; and in an EDS elemental analysis of the composite cathode material, m/n has a standard deviation of $\leq 1\%$ at any position.

14. The olivine composite cathode material according to claim 1, wherein the composite cathode material has an electrical resistivity of $\leq 2,500$ Ω/cm.

15. The olivine composite cathode material according to claim 1, wherein in the composite cathode material, $0.5 \leq m/n \leq 7$.

16. The olivine composite cathode material according to claim 1, wherein the composite cathode material has an average particle size $D_{50}$ ranging from 0.5 μm to 20 μm.

17. The olivine composite cathode material according to claim 1, wherein in an EDS elemental analysis of the composite cathode material, m/n has a standard deviation of $\leq 1\%$ at any position.

18. The preparation method according to claim 5, wherein in step (2):

the slurry has a solid content ranging from 10 wt % to 60 wt %; and the slurry has an average particle size $D_{50}$ ranging from 0.1 μm to 1 μm.

*     *     *     *     *